No. 682,378. Patented Sept. 10, 1901.
J. E. ARMSTRONG.
AUTOMATIC WATER ELEVATOR.
(Application filed Apr. 4, 1901.)
(No Model.)
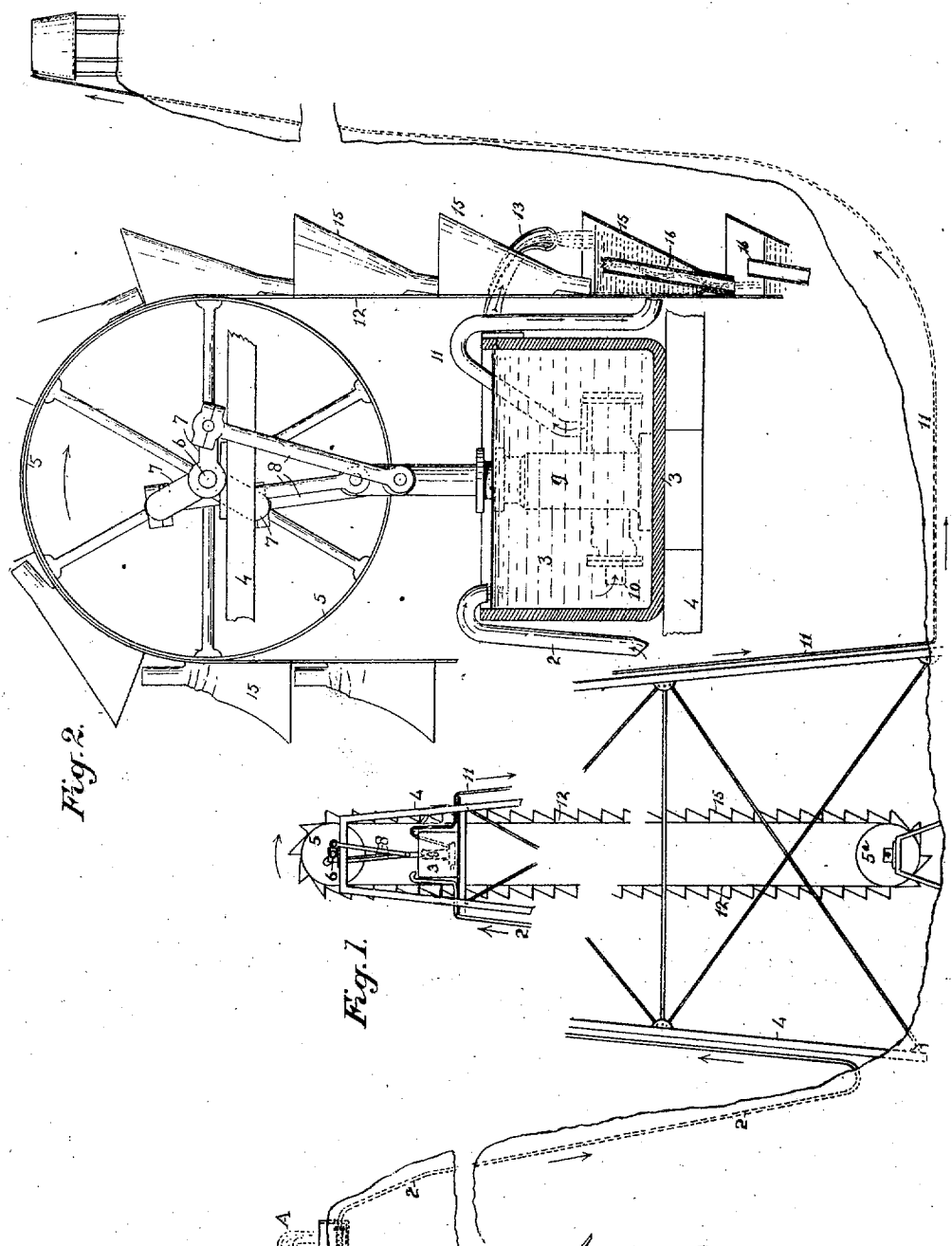

UNITED STATES PATENT OFFICE.

JOHN E. ARMSTRONG, OF SANTA CRUZ, CALIFORNIA.

AUTOMATIC WATER-ELEVATOR.

SPECIFICATION forming part of Letters Patent No. 682,378, dated September 10, 1901.

Application filed April 4, 1901. Serial No. 54,284. (No model.)

*To all whom it may concern:*

Be it known that I, JOHN E. ARMSTRONG, a citizen of the United States, residing at Santa Cruz, county of Santa Cruz, State of California, have invented an Improvement in Automatic Water-Elevators; and I hereby declare the following to be a full, clear, and exact description of the same.

My invention relates to an apparatus which is designed to utilize small bodies of water having a considerable fall, so that a portion of said water can be elevated to a higher point by the action of the remainder through a suitable apparatus.

My invention consists of a mechanism through which the water is continually and automatically applied when collected in sufficient quantities to operate a pump or lifting mechanism which is supplied from the same source, so that a portion of the water is thus delivered to a higher elevation than the source.

My invention also comprises details of construction, which will be more fully explained by reference to the accompanying drawings, in which—

Figure 1 is a general view of the device. Fig. 2 is a sectional view of the receiver and buckets.

The object of my invention is to provide a mechanism by which a small flow of water having a sufficient elevation may be collected into a receiving-tank and thence delivered into an endless chain of peculiarly-constructed buckets, which chain passing over a drum at the upper end acts to drive a pump which takes its supply from the same receiver and lifts a portion of the water arriving from the source of supply to an elevation above the receiver and the source.

As here illustrated, A represents a spring such as are often found on hillsides and which sometimes supply but a very small quantity of water. By means of a pipe 2 the water from this spring is delivered into a tank or receiver 3, located upon the top of a tower, as 4, or it may be placed at a sufficient height in a tree or upon a vertical wall of rock or any place where a sufficient fall from the tank can be had for the purposes of the apparatus. Journaled with suitable relation to the tank is a drum 5, mounted upon a crankshaft 6, the cranks 7 of which are connected by pitmen 8 so as to operate a series of pumps, as at 9. It will be understood that a single pump may be used; but I prefer to use at least three pumps, the cranks of which may be set at equidistant spaces around the shaft, so that the pumps are operated in a continuous manner. The pumps 9 are set inside the tank 3 or suitably connected therewith by an inlet-pipe, as at 10, and the delivery-pipe 11 may lead to any distant or elevated place where the water is required at some point above the level of the spring A. Around the drum 5 passes a belt or chain of buckets 12, and they may also pass around a similar drum $5^a$, the shaft of which is journaled vertically below that of the upper drum. The distance between these drums should be as great as possible, depending, however, upon the supply of water from the spring. If the supply is small, it will take a considerable time to fill the tank 3, and when the latter is filled sufficiently the water overflows from it through a pipe 13, which delivers into the buckets carried upon the belt 12. These buckets are so constructed as to overflow, when filled, from one to the other without waste, the object being where a small quantity of water is available to gradually fill the buckets until a sufficient weight has accumulated upon the belt to start it, when it will operate the pump and give a number of strokes thereof, this number depending upon the height at which the tank is supported and the consequent length of the belt, and as the pump draws its supply from the already-filled tank, from which only the overflow is led into the buckets, there will always be a sufficient amount in the tank to supply the pump. The buckets 15 are here shown made conical in shape, the apex of each bucket being located above the open mouth of the next below. Through the center of these buckets are vertical pipes, as 16, the upper ends of which are slightly below the tops of the buckets, so that each bucket will be filled to the top of its pipe before any water can pass out of it.

The operation will then be as follows: If the supply of water be not larger than a lead-pencil, the tank will be gradually filled until it arrives at the overflow. The overflow-pipe 13 is carried around from the tank to the outside of the belt, which passes in close proximity with the tank, so that when the tank is filled to the pipe the water will be delivered into the upper bucket, filling it to the top of the pipe 16. Through this pipe the water then flows and in the same manner fills the next bucket below, and so on until a sufficient number of buckets have been filled and the weight is enough to start the belt. The tank may be located fifty or one hundred feet or more above the lower pulley. Consequently when the belt starts it will set the pump in motion and a number of strokes of the pump will be made, thus lifting a corresponding amount of water through the delivery-pipe. The belt may then stop when the filled buckets have reached the bottom and will remain stationary until a sufficient number of the buckets have filled to again start the belt. It thus becomes automatic without any care or watching, and the proportion of water that can be lifted by the apparatus as compared with the total amount of the supply is much greater than can be obtained by a hydraulic ram. It also has this advantage, that it operates automatically with no waste of the water and needs no attention to keep it in operation.

Having thus described my invention, what I claim as new, and desire to secure by Letters Patent, is—

1. An apparatus for utilizing a flow of water consisting of a tank and connections by which it is supplied from a source, a tower or elevation upon which the tank is located, a pump submerged in the tank and a crank and means for operating the pump, an endless chain of buckets each bucket of which has its lower end reduced and made conical, an open-ended pipe fitted to said conical end and extending upwardly into the bucket whereby water is delivered from one bucket to the other, a drum upon the crank-shaft over which the chain passes, and an overflow-pipe by which surplus water is delivered from the tank into the buckets.

2. The combination in a water-lifting apparatus of an elevated tank, connections therefrom to a source of supply, an endless chain of buckets, said buckets having conical lower ends, drums mounted upon journal-shafts at the tank and at the bottom of the support around which the chain passes, said tank being located in the vertical plane of and substantially within the belt, a plurality of pumps operated by cranks upon the upper drum-shaft, and supply-inlets to said pumps connected with the tank, an overflow from the upper part of the tank, discharging into the uppermost buckets of the belt, an overflow connection from each bucket to the next below, and consisting of a pipe contained within each bucket, having its upper end slightly below the top of the bucket and its lower end extending through the conical end of the bucket, whereby the buckets are successively filled until the weight acts to start the belt and revolve the pump-shaft.

3. The combination in an apparatus for raising water, of an elevated tank, a source of supply by which the tank is filled, one or more pumps submerged in the tank and connections by which they are supplied from the lower part of the tank, an overflow-pipe from the upper part of the tank, an endless chain of buckets, a drum upon the pump-shaft about which the upper end of the chain passes, a similar drum located at the bottom of the elevated-tank support, around which the lower part of the chain passes, said drums and pump being substantially vertically in line with each other, and said buckets being made conical and having inclosed overflow-pipes discharging through the lower ends of the cones into the next adjacent buckets, the upper end of such pipes being open and just below the level of the tops of the buckets whereby each bucket is filled and the surplus delivered into the next bucket below.

In witness whereof I have hereunto set my hand.

JOHN E. ARMSTRONG.

Witnesses:
W. M. GARDNER,
B. R. MARTIN.